United States Patent Office.

WILHELM UERFBERG AND HEINRICH HEIMANN, OF BERLIN, GERMANY.

BLUE SAFRANIN DYE.

SPECIFICATION forming part of Letters Patent No. 617,703, dated January 10, 1899.

Application filed July 25, 1898. Serial No. 686,866. (Specimens.)

*To all whom it may concern:*

Be it known that we, WILHELM UERFBERG and HEINRICH HEIMANN, subjects of the German Emperor, residing at Berlin, Germany, have invented Improvements in Blue Safranin Dyes, of which the following is a specification.

The invention relates to the production of a valuable blue dyestuff of the safranin series and is based on the following observations: We have discovered that the coloring-matter of the following constitution:

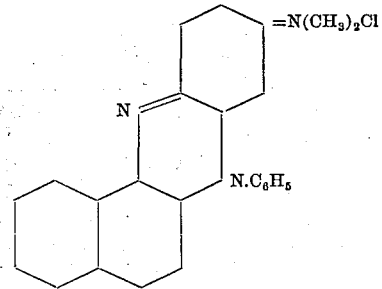

prepared by the action of nitrosodimethylanilin upon phenyl-beta-naphthylamin and known in the trade as "neutral blue" (*Schultz, Tabellarische Uebersicht*, III edition, page 178) can be transformed into a sulfo-acid by treatment with sulfites or bisulfites. Most probably the sulfo group enters into the para position to the nitrogen, forming the azin group, and the constitution of the new sulfo-acid may therefore be represented by the following formula:

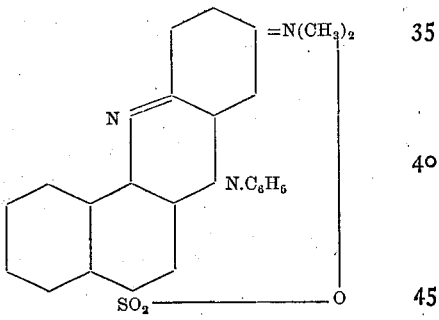

We have, furthermore, discovered that the sulfo group is bound but loosely in the molecule and can easily be eliminated in the form of sulfurous acid and in the same time be replaced by other radicals. By heating the aforementioned sulfo-acid with dimethylparaphenylenediamin a reaction takes place, which is illustrated by the following formula:

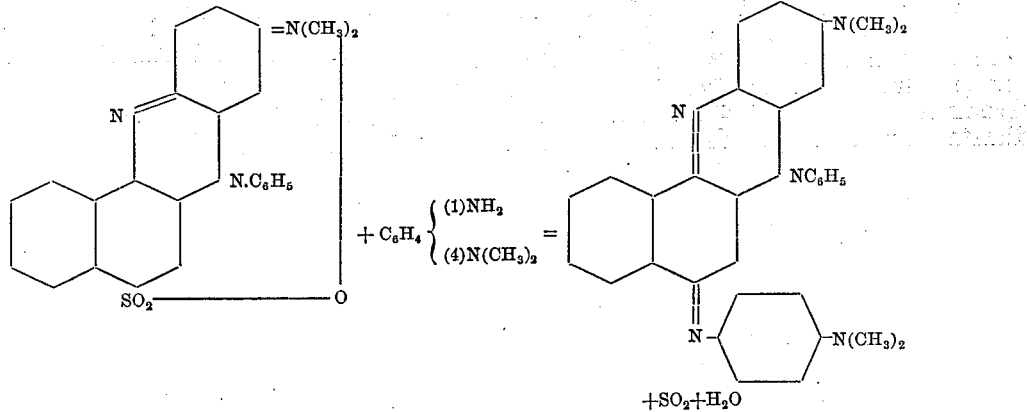

The safranin obtained in this way has been found to be a most valuable dyestuff for dyeing and printing, producing on cotton mordanted with tannin blue shades of great intensity, which possess, moreover, a remarkable fastness against light and washing.

For practically carrying out our invention we may proceed as follows: The parts are by weight. One part of neutral blue is dissolved in ten parts of water. A solution of one part of sodium sulfite in five parts of water is then added and the mixture is slowly heated on the water-bath. After a short time a dark-colored precipitate begins to separate, the solution becoming more and more discolored. As soon as the solution shows but a slight brownish color 1.5 parts of hydrochloric acid are added and the whole is again heated on the water-bath for about one hour. After this time the precipitate is collected on a filter, washed with cold water, pressed, and dried. The product obtained in this way, which represents the sulfo-acid of the above-mentioned constitution, is then dissolved in ten parts of alcohol, to which 1.5 parts of dimethyl-paraphenylenediamin are added. The mixture is heated to boiling until no more sulfurous acid escapes and a sample of the product formed will dissolve in concentrated sulfuric acid with green color. This point reached, the alcohol is distilled off, the residue is dissolved in hot water with addition of an excess of hydrochloric acid, and from the violet solution obtained the coloring-matter is precipitated by means of common salt in the form of crystalline needles with metallic luster.

The new dye is readily soluble in water with violet-blue color. It dissolves in alcohol with violet-blue color and is insoluble in ether. On addition of caustic soda-lye or of sodium carbonate to the aqueous solution a brown-violet precipitate is formed, which is soluble in benzene or ether with violet-red color. Concentrated sulfuric acid dissolves the dye with green color, which on diluting with ice-water changes at first into dull red and on further addition of water becomes bluish red and finally red violet. The aqueous solution of the coloring-matter is discolored on boiling with zinc-dust, but after filtering off the original color soon returns under the influence of the oxygen of the atmosphere.

The following alterations may be made in the above example without materially changing the character of the product obtained: Instead of neutral blue prepared by means of nitrosodimethylanilin we may use as starting product the homologous substance derived from nitrosodiethylanilin. Further, for dimethyl-paraphenylenediamin we may substitute diethylparaphenylenediamin in the second stage of the process.

Having now described our invention, what we claim is—

The hereinbefore-described die prepared from neutral blue by first treating the latter with sulfites and subsequently reacting on the sulfo-acid thus formed with dimethylparaphenylenediamin, which dye possesses in form of the neutral hydrochloric salt the formula:

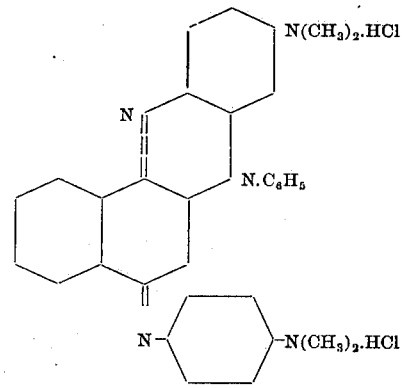

and forms when dry and pulverized a dark-brown powder with metallic luster, soluble in water giving a violet-blue solution in which caustic soda-lye produces a brown-violet precipitate, soluble in alcohol with violet-blue color, insoluble in ether; dissolving in concentrated sulfuric acid with a green color which on adding water changes at first into dull red and on further diluting becomes bluish red and finally red violet; yielding by reduction a leuco compound, readily reoxidizable; said dye producing on mordanted cotton blue shades.

In testimony whereof we hereunto set our hands and affix our seals in the presence of two witnesses.

WILHELM UERFBERG. [L. S.]
HEINRICH HEIMANN. [L. S.]

Witnesses:
 RUDOLF VON ROTHENBURG,
 GUSTAV LUCHT.

Correction in Letters Patent No. 617,703.

Affidavit having been filed showing that the name of the first-mentioned patentee in Letters Patent No. 617,703, granted January 10, 1899, for an improvement in "Blue Safranin Dyes," should have been written and printed *Wilhelm Herzberg*, instead of "Wilhelm Uerfberg," it is hereby certified that the proper correction has been made in the files and records pertaining to the case in the Patent Office, and should be read in the Letters Patent that the same may conform thereto.

Signed, countersigned, and sealed this 21st day of February, A. D., 1899.

[SEAL.]

WEBSTER DAVIS,
*Assistant Secretary of the Interior.*

Countersigned:
    C. H. DUELL,
        *Commissioner of Patents.*